INVENTORS
Marshall B. Alpert
John P. Preston

United States Patent Office 3,632,527
Patented Jan. 4, 1972

3,632,527
PHOTOCONDUCTIVE TITANIUM DIOXIDE COMPOSITION AND ITS METHOD OF PREPARATION
Marshall B. Alpert, Staten Island, N.Y., and John P. Preston, Bricktown, N.J., assignors to N L Industries, Inc., New York, N.Y.
Continuation-in-part of abandoned application Ser. No. 664,105, Aug. 29, 1967. This application Jan. 8, 1970, Ser. No. 1,529
Int. Cl. H01c 7/06; H01b 1/08; C09r 3/00
U.S. Cl. 252—501
5 Claims

ABSTRACT OF THE DISCLOSURE

Euhedral titanium dioxide crystal composition in which the average individual crystal size is from 0.2 to 5.0 microns, said composition containing less than 0.1% $P_2O_5$ and containing less than 0.2% alkali metal oxide selected from the group consisting of $Na_2O$ and $K_2O$, and possessing excellent photoconductive properties. The composition is made by a process wherein a titania hydrate is neutralized with an ammoniacal agent, and treated with an alkali metal treating agent prior to calcining. The crystals may optionally be coated with $Al_2O_3$, $TiO_2$, PbO, $SiO_2$ or ZnO.

---

This application is a continuation-in-part of our application Ser. No. 664,105, filed Aug. 29, 1967, now abandoned.

BACKGROUND OF THE INVENTION

Prior to the instant invention titanium dioxide materials were made primarily for the pigment industry. These pigments are very finely divided $TiO_2$ having an average individual crystal size of about 0.1 to 0.2 micron for anatase pigments and about 0.15 to 0.25 for rutile pigments. These individual crystals are mostly well-rounded having irregular shapes and hence may be classed as being anhedral. These pigments also contain various quantities of treating agents to enhance the desired pigment properties. Such pigment materials are of little or no value when used in the copy paper industry since a pigmented film on paper shows substantially no photoconductivity. In contrast to such prior art pigment materials, the instant composition comprises individual particles of titanium dioxide which are well-formed and have well-defined crystal boundaries i.e. most of the edges are straight lines. Such a well-defined crystal structure is called euhedral, as opposed to anhedral. These euhedral crystals have an average individual crystal size ranging from 0.2 micron to 5.0 microns. These crystals are also free from undesirable impurities. These crystals when properly coated possess excellent photoconductive properties.

SUMMARY OF THE INVENTION

The composition of the instant invention comprises finely divided titanium dioxide crystals containing a metal oxide coating thereon, said titanium dioxide crystals having either an anatase or rutile crystal structure, a majority of the crystal edges being straight-sided, thus being euhedral, said crystals having an average individual crystal size of from 0.2 to 5.0 microns, the metal oxide coating on said crystals being selected from the group consisting of $Al_2O_3$, $TiO_2$, PbO, $SiO_2$ and ZnO, the amount of said coating being from 0.05% to 0.3% for $Al_2O_3$ and for the rest of said metal oxides being from 0.1% to 1.5%, said composition containing less than 0.1% $P_2O_5$ and containing less than 0.5% alkali metal oxide selected from the group consisting of $Na_2O$ and $K_2O$, all of the percentages being based on the weight of the $TiO_2$, said composition possessing excellent photoconductive properties when employed in copy paper systems.

BRIEF DESCRIPTION OF THE DRAWING

In FIGS. 1 and 2 the size of the individual crystals average about 0.7 to 1.5 micron respectively.

DESCRIPTION OF THE PREFERRED EMBODIMENT

Figure 1:
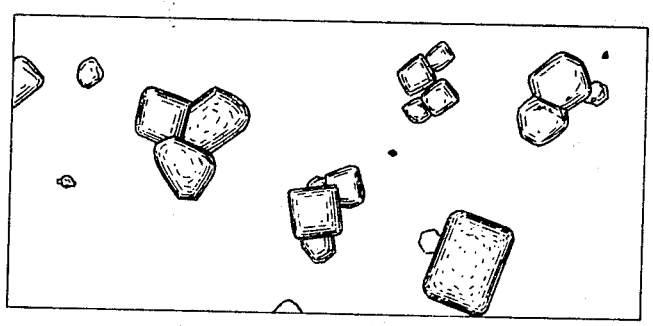
FIGS. 1 and 2 are photomicrographs of the photoconductive titanium dioxide composition produced by the instant invention. Both of the figures clearly show that the titanium dioxide compositions produced are euhedral, i.e. comprises well-defined, highly crystalline particles, a major portion of the crystal edges being straight-sided.

The composition of the instant invention is prepared by the process which comprises hydrolyzing a titanium sulfate-iron sulfate solution to form a titania hydrate, filtering, bleaching and washing said hydrate to remove the soluble iron salts therefrom, said bleached hydrate being substantially iron-free but containing from 5% to 15% $H_2SO_4$ associated with said hydrate, slurrying said hydrate and treating said hydrate with a sufficient amount of an ammoniacal agent selected from the group consisting of ammonia, ammonium hydroxide and ammonium carbonate to neutralize the titania hydrate slurry to a pH of 5.0 to 11.0, washing said titania hydrate to remove the soluble salts therefrom, and retaining sulfate in amount of no more than 2% $SO_3$ in said hydrate, calculated on a $TiO_2$ basis, adding to said washed titania hydrate an alkali metal salt as a treating agent, said salt selected from the group consisting of sodium chloride, sodium sulfate, sodium pyrosulfate, sodium hydroxide, sodium carbonate, potassium chloride, potassium sulfate, potassium pyrosulfate, potassium hydroxide and potassium carbonate, the amount of sodium compound calculated as $Na_2O$ being from 0.4% to 2.0%, the amount of potassium compound calculated as $K_2O$ being from 0.4% to 3.0%, a compound of boron optionally being added if desired in amount from 0.02% to 0.15% boron calculated as $B_2O_3$ on a $TiO$· basis, said hydrate containing no more than 0.1% $P_2O_5$ on a $TiO_2$ basis, calcining said treated hydrate to temperature from 900° C. to 1025° C° for hydrates containing $K_2O$ and 875° C. to 925° C. for hydrates containing $Na_2O$ to develop the highly crystalline anatase titanium dioxide euhedral material and calcining at temperature from 925° C. to 1025° C. for hydrates containing $Na_2O$ to develop the highly crystalline euhedral material containing a substantial amount of rutile and grinding said calcined material, said ground material having an average individual crystal size of from 0.2 to 5.0 microns. The size of the individual crystals are about 0.2 micron when the $K_2O$ treated hydrate is calcined at 900° C. This size increases however to about 0.7 micron when the calcination temperature is raised to 1000° C.

Using $Na_2O$ as the treating agent, the titanium dioxide crystals have the anatase structure when calcined at about 900° C. with the crystal size of about 0.25 micron. When the $Na_2O$ treated titanium dioxide is calcined at 925° C. to 1025° C. the titanium dioxide crystals have substantial quantities of rutile and are about 0.75 to 5.0 microns in size.

The use of potassium salts is preferred over sodium salts since it is easier to maintain the crystal structure of anatase using potassium salts. Potassium chloride or sulfate is particularly desirable to employ since its use reduces the amount of potassium titanate formation to less than 2%.

The rutile content preferably should also be held below 2%.

At this state in the process, a useful intermediate product is formed, i.e. the calcined material. This intermediate product comprises calcined euhedral $TiO_2$ crystals containing from 0.4% to 2.0% of an alkali metal oxide selected from the group consisting of $Na_2O$ and $K_2O$, with the optional inclusion of from 0.02% to 0.15% $B_2O_3$ if desired, and it contains no more than 0.1% $P_2O_5$. The crystals have an average individual size of from 0.2 to 5.0 microns. This intermediate product does possess acceptable photo-conductivity and is useful when incorporated into a limited number of paper systems. Superior photo-conductivity however is obtained when the intermediate product is processed further as follows:

The calcined material is subjected to a wet milling operation where it is dispersed with an alkaline material and subsequently ground.

The ground material is then flocced with an acidic salt, neutralized, filtered and dried. Sulfate salts preferably are to be avoided. The salts used for flocculating may be those which form the metal oxide coatings on the $TiO_2$ crystals. In any event the metal compounds employed are precipitated as oxides from solution on to the surface of the $TiO_2$ crystals. As stated above metal oxide coatings of $Al_2O_3$, $SiO_2$, $TiO_2$, $ZnO$ and $PbO$ are precipitated onto the $TiO_2$ crystal surface to form the composition of the instant invention. These salts may be added singly or in combination. The useful photoconductivity is enhanced when the crystalline $TiO_2$ material contains this type of coating. This coated $TiO_2$ material is useful in many different types of commercial copy paper systems. When the calcined material is subjected to the wet milling treatment, the $Na_2O$ or the $K_2O$ content usually is reduced to within the range of from 0.005% to 0.2%. The $B_2O_3$ is also largely removed during the milling operation.

Calcium or magnesium salts may also be used to coagulate the milled material, but in most cases both the calcium salt and the magnesium salt are substantially completely removed by the water present since they do not form insoluble coatings on the milled material. This non-coated product however is also useful in copy paper systems.

In the instant invention the products obtained have been tested for photoconductivity and found to meet certain standards required for commercial utility. The tests and their standards are described as follows:

TESTS FOR PHOTOCONDUCTIVITY

The titanium dioxide material is pre-dyed with 0.01% fluorescein by mixing the material with a solution of fluorescein in isopropyl alcohol and drying at 90° C.

The pre-dyed titanium dioxide material is dispersed in a solution of styrene-butadiene copolymer made by Goodyear Tire and Rubber Company and sold under the name of Pliolite S–7 type 30.

43.75 grams of the titanium dioxide material are dispersed in 125 mls. of a solution of the copolymer (100 grams copolymer solids or 333 grams of commerical copolymer solution diluted to 1000 ml. with toluene) by mixing in a high speed blender for 5 minutes. The mixture is then applied to an aluminum sheet 0.003 inch thick with a Bird film applicator (gap width 0.006 inch, wet film thickness of about 0.003 inch) to give a coating weight of about 26 pounds per 3000 sq. ft. The film is then oven dried at 50° C. for one minute.

A small piece of the coated foil is then dark-adapted overnight and tested in the dynamic-capacitor electrometer where its electro-photographic properties are measured as follows:

1—charge acceptance
2—dark decay
3—light decay
4—residual voltage

The dynamic-capacitor electrometer used is similar to the apparatus described in R.C.A. Review, 22, 780–90 (1961), except that the one square inch samples are mounted on the rim of the nine inch diameter wheel (30 in. circumference) so that the true charging time and light exposure time are each $\frac{1}{30}$ the nominal time in the cycle. The negative corona is operated at —7000 volts. The probe voltages are followed with a strip chart recorder. The light source is a 500 watt tungsten-iodine filament lamp mounted 8 inches from the edge of the rim. The cycle arbitrarily selected for the test involves 3.0 seconds (nominal) of charging, 2.0 seconds of dark decay, 3.0 seconds of light decay and an additional 3.0 seconds to the end of the cycle giving a total cycle of 11 seconds.

For a titanium dioxide material to be acceptable for the copy paper industry the charge acceptance should be at least 300 volts within a three-second period, the dark decay less than 60% of the charge acceptance, the light decay at least 150 volts in three seconds, and it should have a residual of no more than 15% of charge acceptance after eleven seconds. Typically an acceptable film shows a charge acceptance of 440 volts, a dark decay of 60 volts, a light decay of 360 volts and a residual of 20 volts.

The product produced is then further tested for useful photoconductivity by actually preparing a print on a test film in a commercial copier. For this test, the pigmented copolymer film prepared as described above and coated either on a 3 mil. aluminum foil or a commercially available conductive paper, is dark-adapted overnight and used to make a single page copy on a commercially available copier. For this purpose a Model 33 Electrostatic Copier manufactured by the SCM Corporation is used. A useful photoconductive film will yield a high contrast, clear and sharp copy with a light background and little or no streaking, stemming from inhomogeneous corona charging of the test film, in the direction of motion of the film through the machine.

A more detailed description of the instant invention is presented in the following examples:

EXAMPLE 1

A titania hydrate was prepared by adding a titanium sulfate-ferrous sulfate solution to hot water and boiling the mixture. The titanium sulfate solution used had the following properties:

$TiO_2$—250 g.p.l.
$H_2SO_4$—500 g.p.l.
$F_2SO_4$—169 g.p.l.
$H_2SO_4/TiO_2$—2.0
Spec. gravity—1.675 at 60° C.

3600 mls. of this titanium solution heated to 96° C. were added within a period of 16 minutes to 900 mls. water heated to 96° C. The entire mixture was heated to boiling and boiled for 3 hours to complete the hydrolysis. 950 mls. of hot water were added to the mixture to cut the concentration to 165 g.p.l. $TiO_2$.

The hydrate was filtered, washed free from soluble iron salts, bleached with 10% $H_2SO_4$ and 0.1% aluminum metal for 1 hour at 80° C. at 20% solids, then filtered and washed with water until iron free. The washed filter cake contained 10% $H_2SO_4$ on a $TiO_2$ basis. 2570 grams of the filter cake containing 35% solids were admixed with 1500 mls. water to form a slurry containing 22% solids. With agitation, 31.5 grams of ammonia, added as a solution in water, were added to the hydrate slurry to neutralize substantially all of the sulfuric acid present in the hydrate. The pH of the neutralized hydrate was 7.5. The neutralized hydrate was heated at 60° C. for 1 hour and the pH readjusted with ammonia to a pH of 7.5.

The neutralized solids were then allowed to settle and the solids content were washed with 70 liters of water containing 5 g.p.l. $NH_4Cl$. The washed titania hydrate contained 0.18% sulfate calculated as $SO_3$ and 0.07% $P_2O_5$ on a $TiO_2$ basis.

The washed titania hydrate was then treated with KOH, calculated as 1.25% $K_2O$ on a $TiO_2$ basis, and the treated hydrate was then rotary calcined at 990° C. for 3 hours to produce a highly crystalline anatase titanium dioxide material. The calcined material contained 1.25% $K_2O$, 0.07% $P_2O_3$ and the individual crystals of the $TiO_2$ were euhedral with a major portion of the crystal edges being straightsided. The average individual crystal size was 0.7 micron. The calcined material was then wet milled and coated with 0.1% $Al_2O_3$ by precipitation from an aqueous $AlCl_3$ solution. The coated material was then dried and mikropulverized.

The titanium dioxide composition had the following analysis:

Average crystal size—0.7 micron
$K_2O$—0.1%
$P_2O_5$—0.07%
$Al_2O_3$—0.1%

This crystalline anatase composition was used to make a print by electrostatic copying as follows:

45 grams of the titanium dioxide material were dyed with fluorescein by mixing the titanium dioxide with 10 mls. isopropyl alcohol containing 0.45 g.p.l. fluorescein. 20 mls. of isopropyl alcohol were also added to thoroughly wet the titanium dioxide particles. The amount of dye used was 0.01% based on the weight of the titanium dioxide. The isopropyl alcohol was then evaporated in a forced draft oven at 90° C.

43.75 grams of the dyed titanium dioxide particles were mixed thoroughly in a blender with 125 ml. of a resin mixture containing 100 grams of the butadiene-styrene polymer diluted to one liter with toluene, as previously described.

Drawdowns of the mixture using a 0.003 inch Bird applicator blade were prepared on an aluminum sheet 3 mil. in thickness. The coated aluminum sheet was then dried for 1 minute at 50° C. in a forced draft oven. The aluminum sheet was dark-adapted overnight and then loaded into a SCM Copier in the dark and an excellent quality print with good resolution, contrast and fill-in was obtained.

The photoconductive properties of the coated sheet after being dark-adapted overnight also were determined as follows:

| | Volts |
|---|---|
| Charge acceptance | 480 |
| Dark decay | 40 |
| Light decay | 420 |
| Residual voltage | 20 |

A photomicrograph of this crystalline material is shown in FIG. 1.

The same coating mixture was also applied to one surface of a conductive paper having a surface electrical resistivity of about $10^9$ ohms per square. The coated paper was dried for one minute at 50° C. and dark-adapted overnight. It was also loaded into an SCM Model 33 Copier, and an excellent quality print was obtained.

EXAMPLE 2

Two other portions of the calcine prepared in Example 1 were ball-milled and one portion was flocced with $MgCl_2$ (0.5% on a $TiO_2$ basis) while the other portion was flocced with $CaCl_2$ (0.1% CaO on a $TiO_2$ basis). Both portions were neutralized at pH 7.0, washed chloride free, dried at 120° C. and mikropulverized. In both of these cases most of the flocculating metal compound was lost in the wash water. The finished $TiO_2$ material contained only 0.01% MgO and even less CaO. When these products were pre-dyed with fluorescein, dispersed in the copolymer described above, drawn-down on an aluminum sheet and dark-adapted, satisfactory prints were obtained, using these $TiO_2$ products even though they contained no coating agents.

EXAMPLE 3

The $TiO_2$ calcined product was prepared in the same manner as that described in Example 1 except that the calcined material was wet ball-milled and treated with 0.5% ZnO by adding $ZnCl_2$, neutralizing to pH of 7.0 with NaOH, washing with $H_2O$ until choride free, dried and mikropulverized. In this example substantially all of the zinc added remained on the $TiO_2$ pigment.

Excellent prints were made in the same manner using the butadiene-styrene copolymer described above. In addition an excellent print was also made using a methyl methacrylate polymer made by E. I. du Pont and sold under the name of Elvacite 6014.

EXAMPLE 4

The $TiO_2$ calcined material used in this example was prepared in the same manner as that described in Example 1. The calcine was ball-milled, treated at 60° C. with 0.5% PbO by adding lead acetate (slightly acidified with acetic acid and neutralized to pH 8.0 with NaOH solution to precipitate the lead oxide onto the surface of the $TiO_2$ crystals. After thoroughly washing, drying and mikropulverizing, it was found that substantially all of lead values remained on the $TiO_2$ crystals. Excellent prints were obtained with both of the resin systems previously described. In addition a good print was made with a self-curing polyvinyl acetate copolymer sold under the name of Gelva 270 by Monsanto Company.

EXAMPLE 5

In this example the same calcined product as previously described was ball-milled and treated with 0.5% $TiO_2$ which was formed by adding aqueous $TiCl_4$ solution an neutralizing with NaOH. The treated product was washed chloride free, dried at 120° C. and mikropulverized. When pre-dyed with fluoroescein, dispersed and drawn down on aluminum, it yielded excellent prints with the butadiene-styrene copolymer and the polyvinyl acetate copolymer described above. In addition a good print was also obtained using an alkyd resin sold under the name of Arotap 3201–X–47, supplied by Archer Daniels Midland Co. diluted to 100 grams vehicle solids per liter with toluene and also 30 ml. methyl ethyl ketone per liter of solution.

EXAMPLE 6

Using the same calcine as that previously described, the calcine was ball milled and treated with 0.5% $TiO_2$, added as $TiCl_4$, and 0.5% ZnO, added as $ZnCl_2$, neutralized to pH 7.0 with NaOH solution, washed, dried and mikropulverized. This particular coated $TiO_2$ composition yielded prints that were slightly more satisfactory than the prints prepared in Example 5. These prints were somewhat stronger when prepared at higher relative humidities. The prints were prepared in the butadiene-styrene copolymer, the polyvinyl acetate copolymer and the methyl methacrylate polymer all previously described.

EXAMPLE 7

The same calcined product was ball-milled as before, treated at 60° C. with sodium silicate and HCl to give 0.5% $SiO_2$ on a $TiO_2$ basis, dried at 120° C. and mikropulverized. When pre-dyed with 0.01 percent fluorescein and prepared as films on aluminum sheet in accordance with above description, excellent prints with the butadiene-styrene copolymer were obtained.

EXAMPLE 8

The same calcine prepared above was merely mikropulverized. This dry milled product is the so-called intermediate product described above. It has the following analysis:

Average crystal size—0.7 micron
$K_2O$—1.2%
$P_2O_5$—0.07%

When this dry milled $TiO_2$ intermediate product was pre-dyed with fluorescein and dispersed in the butadiene-styrene copolymer and drawn down with 0.003 inch Bird Applicator on an aluminum sheet, a good print was obtained. Other resin mixtures however produced inferior prints.

EXAMPLE 9

The same desulfated hydrate described in Example 1 was given a precalcination treatment with 1.5% $K_2O$ from KOH. It was calcined for three hours at 900° C. 200 g. of the calcine were chaser milled, slurried into 3.5 liters water, heated near boiling for one hour with agitation, then treated with 0.1 percent $Al_2O_3$ from aluminum chloride solution, neutralized to pH 7.2, filtered, washed chloride free, dried at 120° C. and air milled in a laboratory air mill. The $TiO_2$ composition was substantially anatase and contained less than 1% rutile. Particle size counts on electron micrographs showed an average weight diameter to be 0.23 microns, and the particles to be largely single crystals. The product contained 0.1% $Al_2O_3$, 0.07% $P_2O_5$ and only 0.1% $K_2O$, the balance of the $K_2O$ having been leached off during the treatment stage.

The $TiO_2$ composition was pre-dyed with 0.01 percent fluorescein from isopropyl alcohol and dispersed at a 3:1 pigment: vehicle solids ratio in a toluene solution containing 100 g. of butadiene-styrene copolymer solids per liter. The coating mixture was drawn down on 3 mil. aluminum sheet with an applicator giving a 0.003 inch wet film thickness. The coated sheet was dried at 50° C. for one minute and then dark adapted overnight. Printing on an SCM Model 33 Copier yielded a very strong print showing only very slight gray background. While the print was quite satisfactory it was not quite as good in quality as that obtained in Example 1 in that corona inhomogeneity did result in slight streaking and the background was not quite as light. A replicate film was also subjected to dynamic testing after being dark-adapted. Charge acceptance was excellent, 880 volts, but dark decay was fairly high, 480 volts, while light decay was 400 volts with a zero residual charge.

EXAMPLE 10

Using the same neutralized hydrate as Example 1, the precalcination treatment was 1.5 percent $K_2O$ and 0.1 percent $B_2O_3$. After calcining at 900° C. it was milled and treated in the manner described in Example 9. A good print was prepared in the butadiene-styrene copolymer.

EXAMPLE 11

Products were identical to those of Examples 9 and 10 except that the hydrate was desulfated by neutralizing with ammonium hydroxide to a pH of 6.7 and the hydrate washed with deionized water until there was indication of the start of peptization. The washed titania hydrate contained 0.21% sulfate, calculated as $SO_3$ on a $TiO_2$ basis and 0.07% $P_2O_5$. The finished products when incorporated into the butadiene-styrene films on aluminum yielded electrostatic prints substantially identical in quality to those obtained in Examples 9 and 10.

EXAMPLE 12

Titania hydrate prepared in Example 1 was given a precalcination treatment with sodium hydroxide equivalent to 0.5% $Na_2O$ on a $TiO_2$ basis. The dried treated titania hydrate was calcined at 900° C. for three hours. The calcine was finished as in Example 8 by chaser milling, treating with 0.1% $Al_2O_3$, drying and laboratory air milling. The finished $TiO_2$ composition was substantially all anatase with only one percent rutile. An electron micrograph of the material showed the approximate average crystal size to be about 0.25 microns. The product was pre-dyed with 0.1% fluorescein and dispersed as in Example 9 in the butadiene-styrene copolymer at a 3:1 pigment: vehicle solids ratio and drawn down with a 0.003 inch wet film applicator on aluminum sheet. After being dried at 50° C. for one minute and dark-adapted overnight, the coating gave a good quality print in the SCM Model 33 Copier, approximately equivalent to that obtained in Example 9, but showing slightly more streaking due to corona inhomogeneity and a slightly darker background than was obtained for the $TiO_2$ composition in Example 1.

EXAMPLE 13

Figure 2:
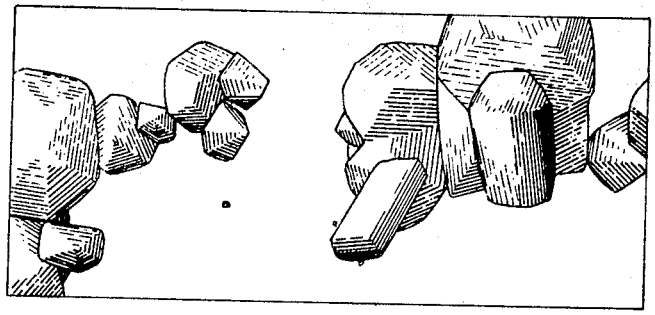
Figure 3:
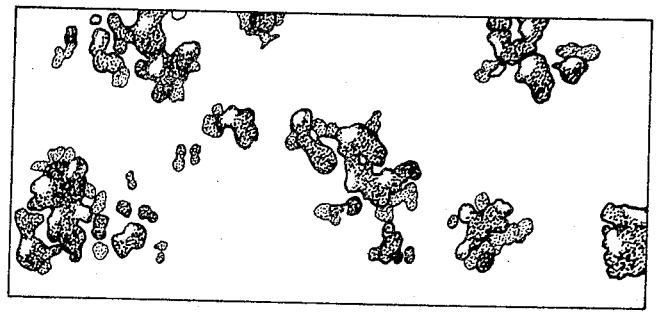
FIG. 3 is presented for comparison to show a photomicrograph of the prior art titanium dioxide commercial pigment material. In this figure the particles are anhedral, i.e. they do not possess a well-defined crystal shape and most of the crystal edges are rounded instead of being straight-sided. These particles are also clustered together and their individual crystal size is about 0.18 mircron.

The same desulfated hydrate as described in Example 1 was given a precalcination treatment with boric acid equivalent to 0.05% $B_2O_3$ and NaOH equivalent to 0.75% $Na_2O$ on a $TiO_2$ basis. The treated hydrate was calcined for three hours at 950° C. A 300 g. portion was ball-milled for 2 hours, diluted to 3.5 liters, heated to 60° C. flocced with calcium chloride, equivalent to 0.1% CaO on a $TiO_2$ basis, neutralized to pH 6.5, filtered, washed chloride free, dried and mikropulverized. The resultant product was largely anatase but contained 25% rutile. A micrograph of the material is shown in FIG. 2. It is estimated that the average crystal size is about 1.5 micron. The product was pre-dyed with fluorescein and dispersed in the butadiene-styrene copolymer as in previous examples at a 3.5:1 $TiO_2$: copolymer solids ratio. It was drawn down to a 0.003 inch wet film thickness on an aluminum sheet, dried at 50° C. for one minute and dark-adapted overnight. It gave a satisfactory strong print with light background but streaking along the direction of traverse of the film through the copying machine and stemming from corona charge inhomogeneities was noticeable. This corona charge inhomogeneity in the printing unit may be largely avoided by using tungsten wire across the face of the corona charge unit of the Copier rather than nylon thread and also by avoiding plastic spacers on the corona wires themselves.

EXAMPLE 14

The same desulfated hydrate, treated with 0.1% $B_2O_3$ from boric acid and 0.5% $Na_2O$ from sodium hydroxide was calcined for three hours at 900° C. A portion was chaser milled, ball-milled two hours, treated as in Example 13 with $CaCl_2$, dried and mikropulverized. The product was largely anatase but contained 11% rutile. It was pre-dyed with 0.1% fluorescein. Separate portions were each dispersed in 125 ml. of the butadiene-styrene solution (100 g. vehicle solids per liter) in a blender with the successive $TiO_2$ weights being adjusted so that coatings with $TiO_2$: vehicle solids ratios of 2.5:1, 3.0:1, 3.5:1, 4.0:1, 4.5:1, and 5.0:1 were produced. These coatings were drawn down on aluminum at 0.003 inch wet film thickness, dried at 50° C. for one minute and dark adapted overnight. One set of panels was printed in the normal manner on the SCM Copier. All the panels yielded in general acceptable prints although optimum print quality was obtained at the 3.5:1 pigment: vehicle solids ratio. The SCM machine was then modified by reversing the leads of the high voltage circuit to the corona charging unit so that the coating during traverse through the Copier would be charged positively rather than negatively. Also the toner ordinarily supplied for use with the apparatus was removed and after the apparatus was cleaned of toner a supply of reverse charge (negative) toner (N–9 toner, Phillip A. Hunt Co., Palisades Park, N.J.) dispersed in Freon TF (Dupont) was placed in the toner tray of the apparatus. A replicate set of dark adapted coated aluminum sheets was then printed in the apparatus. Print strength increased with increasing $TiO_2$:solids vehicle ratio. Particularly satisfactory prints were obtained with the 4.5:1 and 5.0:1 ratios, the prints being strong with substantially no streaking from corona inhomogeneities. It was particularly observed that large black areas in the original were produced with much more uniform fill-in on the copies than is generally obtained with electrostatic copying. A sheet of commercial Electrofax paper that contains a photoconductive zinc oxide coating showed no print whatsoever in the modified copier.

EXAMPLE 15

Fully desulfated hydrate as described in Example 1 was given a precalcination treatement consisting of 4.0% of a rutile promoter sol, 0.1% $B_2O_3$ from boric acid, and 0.5% $Na_2O$ from sodium hydroxide, all treatments on a $TiO_2$ basis. The dried treated hydrate was rotary calcined for three hours at 896° C. The calcine was chaser milled. 200 g. were dispersed in 3.5 liters water, heated to 60° C. flocced with $CaCl_2$ solution equivalent to 0.1% CaO on a $TiO_2$ basis, neutralized to pH 7.0 with hydrochloric acid, washed chloride free, dried 120° C. and mikropulverized. The material was 99% rutile from X-ray diffraction analysis. The crystals were elongated with lengths ranging from about 1.5 to 5.0 microns. A portion of the product was pre-dyed with 0.01% fluorescein and 37.5 grams of this pre-dyed material was dispersed in 125 mls. of the butadiene-styrene copolymer solution in toluene, 100 grams vehicle solids per liter, in a blender. ($TiO_2$:vehicle solids ratio 3.0:1.) The coating was drawn down on 3.0 ml. aluminum sheet at 0.003 inch wet film thickness, dried 50° C. for one minute, dark adapted overnight and printed on an SCM Copier. The print was very strong in contrast and streak-free but the background was relatively gray and hence not as satisfactory as in the case of prints prepared in Examples 1 through 8.

EXAMPLES 16–18

The calcined $TiO_2$ material was produced according to the procedure described in Example 1 and post-treated with ZnO as described in Example 3 except that in these examples the titanium hydrate was neutralized to pH of 6.7 with $NH_4OH$ and the neutralized hydrate was treated with the following agents:

Example 16: 2% $K_2O$, added as KCl
Example 17: 2% $K_2O$, added as $K_2SO_4$
Example 18: 2% $K_2O$, added as $K_2S_2O_7$ In all of these examples less than 2% rutile and less than 2% potassium titanate were present in the calcined products. Prints were prepared from these products using the methyl methacrylate resin system described in Example 3 but using a film thickness of only 0.0015 inch. The fluorescein dye was added at 0.02% on a pigment basis to the paint mix prior to blending. Again excellent prints were obtained.

EXAMPLE 19

In this example the procedure of Example 16 was repeated using KCl as a treating agent and ZnO has a postcalcination treatment but after the ZnO postcalcination treatment was applied, the ZnO treated $TiO_2$ was heat treated at 410° C. for 2 hours. Prints made from this product were exceptionally clear and of high quality.

While this invention has been described and illustrated by the examples shown, it is not intended to be strictly limited thereto, and other variations and modifications may be employed within the scope of the following claims.

We claim:

1. Composition of matter consisting essentially of euhedral titanium dioxide crystals, a majority of the edges of said crystals being straight-sided, said crystals having an average individual crystal size of from 0.2 to 5.0 microns, said crystals being coated with a metal oxide selected from the group consisting of $Al_2O_3$, $TiO_2$, PbO, $SiO_2$ and ZnO and mixtures thereof, the amount of said coating being from 0.05% to 0.3% for $Al_2O_3$, and for the other metal oxides being from 0.1% to 1.5%, said composition containing less than 0.1% $P_2O_5$ and containing less than 0.5% of an alkali metal oxide selected from the group consisting of sodium oxide and potassium oxide, all percentages being based on the weight of the titanium dioxide, said composition possessing excellent photoconductive properties when incorporated into copy paper systems, said composition prepared by treating a titania hydrate with an ammoniacal agent to neutralize the hydrate, treating the neutralized hydrate with an alkali metal treating agent in amount of 0.4% to 2.0% and calcining the treated hydrate to develop the highly euhedral crystal structure, said calcined $TiO_2$ thus being milled and treated with said coating agent.

2. Process for preparing an euhedral titanium dioxide crystal composition which comprises hydrolyzing a titanium sulfate-iron sulfate solution to form a titania hydrate, filtering, bleaching and washing said hydrate to remove the soluble iron salts therefrom, said bleached hydrate being substantially iron free but containing from 5% to 15% $H_2SO_4$ associated with said hydrate, slurrying said hydrate and treating said hydrate with a sufficient amount of an ammoniacal agent selected from the group consisting of ammonia, ammonium hydroxide and ammonium carbonate to neutralize the titania hydrate slurry to a pH of 5.0 to 11.0, washing said titania hydrate to remove the soluble salts therefrom, and retaining no more than 2.0% $SO_3$ in said hydrate, calculated on a $TiO_2$ basis, adding to said washed titania hydrate an alkali metal treating agent selected from the group consisting of sodium chloride, sodium sulfate, sodium pyrosulfate, sodium hydroxide, sodium carbonate, potassium chloride, potassium sulfate, potassium pyrosulfate, potassium hydroxide, and potassium carbonate, the amount of sodium compound calculated as $Na_2O$ being from 0.4% to 2.0%, the amount of potassium compound calclated as $K_2O$ being from 0.4% to 3.0% optionally adding a compound of boron if desired in amount from 0.02% to 0.15% calculated as $B_2O_3$, said hydrate containing no more than 0.1% $P_2O_5$, all percentages based on the weight of $TiO_2$, calcining said treated hydrate at temperature from 900° C. to 1025° C. for hydrates containing $K_2O$ and 875° C. to 925° C. for hydrates containing $Na_2O$ to develop the highly crystalline anatase titanium dioxide euhedral material and calcining at temperature from 925° C. to 1025° C. for hydrates containing $Na_2O$ to develop the highly crystalline euhedral material containing a substantial amount of rutile and grinding said calcined material, said ground material having an average individual crystal size of from 0.2 to 5.0 microns, thus forming an intermediate product, said grinding operation being carried out by dispersing sad calcined material in aqueous media and ball-milling said material to obtain said finely ground $TiO_2$, flocculating said ground material with an acidic salt preferably other than a sulfate salt, neutralizing to pH of 6 to 9, filtering, washing, and drying said flocced material, said acid salt being selected from the group of metals consisting of aluminum, titanium, lead, silicon, and zinc thus forming a precipitated metal oxide coating on said $TiO_2$ crystals being from 0.05% to 0.3% for salts of aluminum and from 0.1% to 1.5% for salts of titanium, lead, silicon and zinc, all percentages calculated as metal oxides on a $TiO_2$ basis, and drying and milling said coated $TiO_2$ crystals.

3. Process for preparing an euhedral titanium dioxide crystalline material which comprises hydrolyzing a titanium sulfate-iron sulfate solution to form a titania hydrate, filtering, bleaching and washing said hydrate to remove the soluble iron salts therefrom, said bleached hydrate being substantially iron free but containing from 5% to 15% $H_2SO_4$ associated with said hydrate, slurrying said hydrate and treating said hydrate with a sufficient amount of an ammoniacal agent selected from the group consisting of ammonia, ammonium hydroxide and ammonium carbonate to neutralize the titanium hydrate slurry to a pH of 5.0 to 11.0, washing said titanium hydrate to remove the soluble salts therefrom, and retaining no more than 2.0% $SO_3$ in said hydrate, calculated on a $TiO_2$ basis, adding to said washed titanium hydrate an alkali metal treating agent selected from the group consisting of sodium chloride, sodium sulfate, sodium pyrosulfate, sodium hydroxide, sodium carbonate, potassium chloride, potassium sulfate, potassium pyrosulfate, potassium hydroxide, and potassium carbonate, the amount of sodium compound calculated as $Na_2O$ being from 0.4% to 2.0%, the amount of potassium compound calculated as $K_2O$ being from 0.4% to 3.0% optionally adding a compound of boron if desired in amount from 0.02% to 0.15% calculated as $B_2O_3$, said hydrate containing no more than 0.1% $P_2O_5$, all percentages based on the weight of $TiO_2$, calcining said treated hydrate to temperature from 900° C. to 1025° C. for hydrates containing $K_2O$ and 875° C. to 925° C. for hydrates containing $Na_2O$, to develop the highly crystalline anatase titanium dioxide euhedral material and calcining at temperature from 925° C. to 1025° C. for hydrates containing $Na_2O$ to develop the highly crystalline euhedral material containing a substantial amount of rutile, and grinding said calcined material, said ground material having an average individual crystal size of from 0.2 to 5.0 microns, thus forming an intermediate product, said grinding operation being carried out by dispersing said calcined material in aqueous media ball-milling said material to obtain said finely ground $TiO_2$, flocculating said ground material with an acidic salt preferably other than a sulfate salt, neutralizing to pH 6 to 9, filtering, washing and drying said flocced material, said acid salt being selected from the group of metals consisting of magnesium and calcium, the amount of said salt being sufficient to flocculate said ground $TiO_2$, washing said ground $TiO_2$, said salts being substantially all removed during the washing step, thus leaving substantially no coating on said $TiO_2$ crystals and drying and milling said $TiO_2$ crystals.

4. An euhedral titanium dioxide crystalline material, a majority of the crystal edges being straight-sided, said crystals having an average individual crystal size of from 0.2 to 5.0 microns, said crystalline $TiO_2$ containing less than 0.1% $P_2O_5$ and less than 0.5% of an alkali metal oxide selected from the group consisting of sodium oxide and potassium oxide, all percentages being based on the weight of said $TiO_2$ crystals, said crystalline material having substantially no metal oxide coating yet having commercially acceptable photoconductive properties when incorporated into copy paper systems, said composition prepared by treating a titania hydrate with an ammoniacal agent to neutralize the hydrate, treating the neutralized hydrate with an alkali metal treating agent in amount of 0.4% to 2.0%, calcining the treated hydrate to develop the highly euhedral crystal structure and wet milling, washing and drying said calcined $TiO_2$.

5. A dry milled calciner discharge composition consisting essentially of euhedral titanium dioxide crystals, said crystals having an individual crystal size of from 0.2 to 5.0 microns, said composition also containing potassium oxide, the amount of said potassium oxide being from 0.4% to 3.0% said composition containing less than 0.1% $P_2O_5$ and if desired also containing from 0.02% to 0.15% $B_2O_3$, said milled composition having photoconductive properties when employed in copy paper systems, said composition prepared by treating a titania hydrate with an ammoniacal agent to neutralize the hydrate, treating the neutralized hydrate with a potassium treating agent in amount of 0.4% to 3.0% and calcining the treated hydrate to develop the highly euhedral crystal structure.

References Cited
UNITED STATES PATENTS

| | | | |
|---|---|---|---|
| 2,331,444 | 10/1943 | Wainer | 22—501 |
| 2,516,548 | 7/1950 | Canuenberg et al. | 23—202 |
| 2,671,031 | 3/1954 | Whately | 117—100 |

CHARLES E. VAN HORN, Primary Examiner

J. P. BRAMMER, Assistant Examiner

U.S. Cl. X.R.

23—202; 96—1.5; 117—100